United States Patent
Annavajjhala et al.

(10) Patent No.: US 6,605,984 B2
(45) Date of Patent: Aug. 12, 2003

(54) CHARGE PUMP RIPPLE REDUCTION

(75) Inventors: Ravi P. Annavajjhala, Folsom, CA (US); Mary Frances Therese B. Yuvienco, Las Pinas (PH)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/038,499

(22) Filed: Jan. 2, 2002

(65) Prior Publication Data

US 2003/0122609 A1 Jul. 3, 2003

(51) Int. Cl.[7] .................................................. G05F 3/08
(52) U.S. Cl. ....................................... 327/536; 327/535
(58) Field of Search .......................... 327/407, 534–537, 327/544; 363/59, 60; 365/189.09, 227

(56) References Cited

U.S. PATENT DOCUMENTS

| 5,216,588 A | * | 6/1993 | Bajwa et al. ................. 363/60 |
| 5,301,150 A | | 4/1994 | Sullivan et al. .......... 365/185.08 |
| 5,352,936 A | | 10/1994 | Allen ........................ 327/530 |
| 5,414,669 A | | 5/1995 | Tedrow et al. ............... 365/226 |
| 5,442,586 A | | 8/1995 | Javanifard et al. ...... 365/185.29 |
| 5,455,794 A | | 10/1995 | Javanifard et al. ...... 365/185.01 |
| 5,517,138 A | | 5/1996 | Baltar et al. ................. 326/105 |
| 5,553,030 A | | 9/1996 | Tedrow et al. ............... 365/226 |
| 5,602,794 A | | 2/1997 | Javanifard et al. .......... 365/226 |
| 5,644,534 A | * | 7/1997 | Soejima ................. 365/185.23 |
| 5,732,039 A | | 3/1998 | Javanifard et al. .......... 365/226 |
| 5,767,735 A | | 6/1998 | Javanifard et al. .......... 327/536 |
| 5,781,473 A | | 7/1998 | Javanifard et al. ...... 365/185.18 |
| 5,937,063 A | | 8/1999 | Davis ........................ 713/187 |
| 5,946,258 A | | 8/1999 | Evertt et al. ................. 365/226 |
| 6,097,161 A | * | 8/2000 | Takano et al. ............... 327/536 |
| 6,151,229 A | * | 11/2000 | Taub et al. .................... 363/60 |
| 6,369,642 B1 | * | 4/2002 | Zeng .......................... 327/536 |

* cited by examiner

*Primary Examiner*—Timothy P. Callahan
*Assistant Examiner*—Terry L. Englund
(74) *Attorney, Agent, or Firm*—Fish & Richardson P.C.

(57) ABSTRACT

Circuits reduce the ripple in charge pump output by staggering the times at which charge is drawn from the pump. In one embodiment, the outputs of a two-array high current pump are staggered by multiplexing two pairs of clock inputs, the second pair being 180 degrees out of phase with the first clock input pair. When an EEPROM is in a programming or erase algorithm, multiplexers switch the clock inputs to the second array, effectively inverting the input clock signals. After switching, the output from the second array is 180 degrees out of phase with the output from the first array. The peak-to-peak ripple in the charge pump output is thereby reduced to about 400 mV or less.

29 Claims, 3 Drawing Sheets

CHARGE PUMP RIPPLE REDUCTION

TECHNICAL FIELD

This invention relates to computer systems and, more particularly, to methods and apparatus for controlling the output voltage produced by charge pumps used for programming and erasing flash electrically-erasable programmable read only memory (flash EEPROM) arrays.

BACKGROUND

There has been a recent trend to reducing the power requirements of portable computers. In order to lower power consumption, much of the integrated circuitry used in personal computers is being redesigned to function at lower voltage levels. Some of the circuitry used in portable computers are being designed to operate at low voltage levels such as 5 volts and 3.3 volts. This helps to reduce the power needs of such computers.

Unfortunately, some devices used in portable computers require higher voltages. Flash electrically erasable programmable read only memory (flash EEPROM memory) has recently been used to store the basic input/output startup (BIOS) processes for personal computers, and in particular for portable personal computers. This memory may be erased and reprogrammed without being removed from the computer by running an update program when the BIOS processes are to be changed. However, in order to erase and reprogram flash EEPROM memory, approximately twelve volts, a voltage level not readily available from the lower voltage batteries provided in portable computers, is required.

Flash EEPROM memory arrays have been used in personal computers as a type of long term memory. A flash EEPROM memory array can be used in place of a hard disk drive, thereby providing a smaller, lighter long term storage device that is not as sensitive to physical damage. Such flash memory arrays are especially useful in portable computers, where space and weight are important considerations. However, these flash EEPROM memory arrays also require much higher voltages and substantially more power than that directly available from the batteries of low power portable computers.

In some electronic devices, charge pump circuits have been used to provide a high voltage from a lower voltage source. Recently, charge pumps have been integrated with flash arrays to supply voltages needed to accomplish erase and program operations of flash memory when such voltages are not available from an external source.

However, erasing and programming the cells of a flash EEPROM memory array requires very accurate voltages. The voltages provided by charge pumps and other circuitry implemented as part of integrated circuits, including voltage reference circuits, typically vary due to factors such as operating temperatures, supply voltages, process variations, and load currents. Moreover, when charge pumps are used to supply the voltage, the voltage level provided at the output terminal of a charge pump tends to vary substantially from a desired voltage value. Reference voltages can be used to regulate the output voltage of charge pumps.

One of the problems encountered in utilizing charge pumps is that the output of a charge pump is furnished in a series of charge pulses which are stored to provide a source voltage. The charge pump generates this form of output because the output stage functions in the manner of a diode which only transfers charge to the output in the forward biased condition. This creates a voltage ripple on the output of the pump when the current requirements are high relative to the capacitance of the load. Another drawback is that power supply noise can be created because the inductance of bond wires and lead frames produces spikes in the internal supply voltage with the pulsing output current provided by the charge pump. The variation in the voltage Vcc provided may be sufficient to cause internal switching of devices. These two different problems make it desirable to attempt to smooth the output voltage provided by the charge pumps.

DESCRIPTION OF DRAWINGS

Like reference symbols in the various drawings indicate like elements.

DETAILED DESCRIPTION

Figure 1:
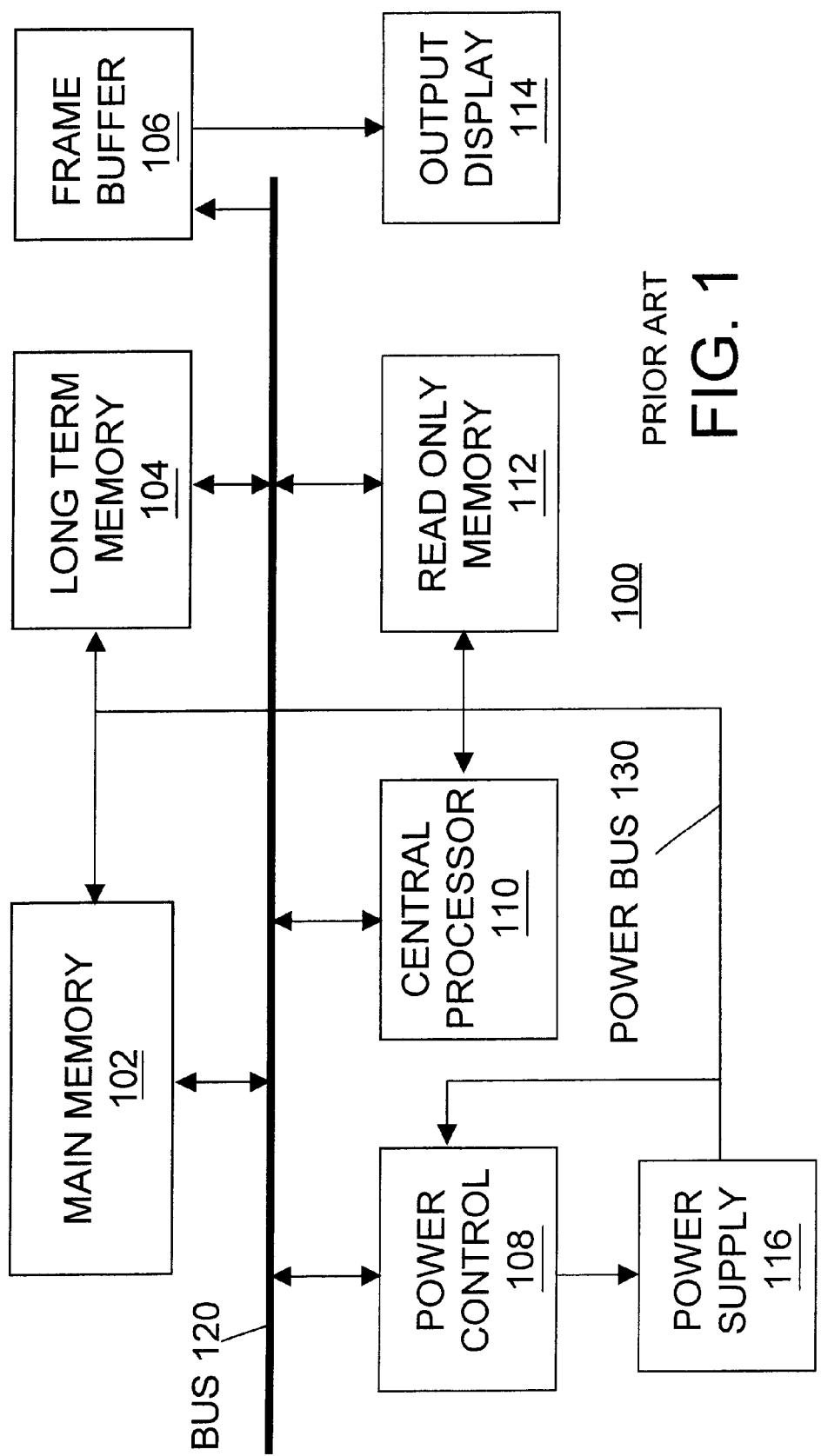
FIG. 1 is a block diagram illustrating a computer system that can utilize the present invention.
Figure 2:
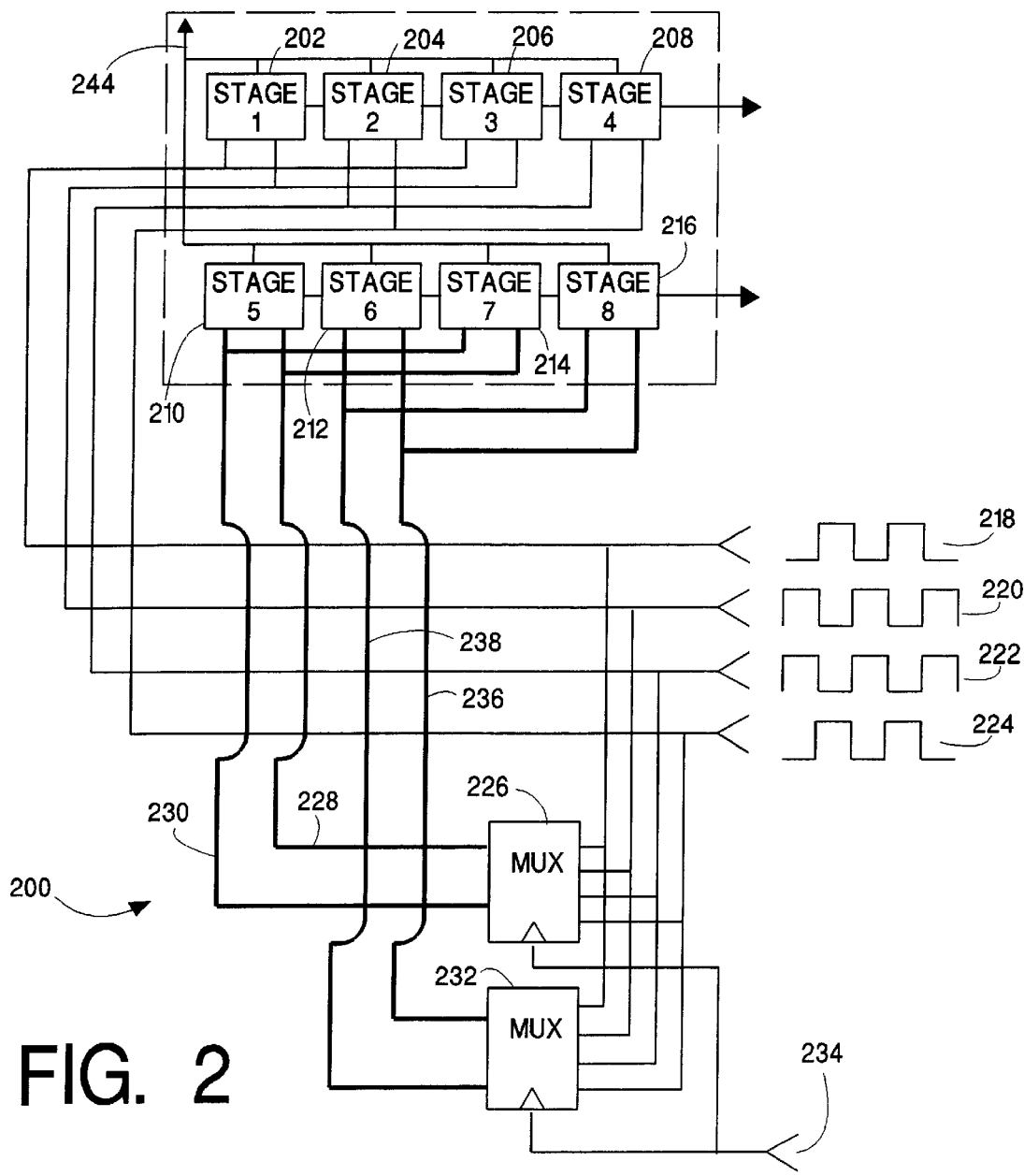
FIG. 2 is a circuit diagram illustrating one embodiment of a ripple reduction circuit that can be used in the system of FIG. 1.

Described below are various integrated and discrete circuits that reduce the ripple in charge pump output by staggering the times at which charge is drawn from the pump. FIGS. 1–2 depict an exemplary ripple reduction circuit and a computer system in which such a circuit can be implemented. A two-array high current pump provides a pre-selected output voltage for use in programming and erase operations. When the EEPROM is in a programming or erase algorithm, the pulse outputs from the two arrays are staggered so that they do not occur simultaneously. This is accomplished by multiplexing two pairs of clock inputs, the second pair being out of phase (e.g., about 180 degrees out of phase) with the first clock input pair. Multiplexers switch, and effectively invert, the clock inputs to the second array. After switching, the output from the second array is about 180 degrees out of phase with the output from the first array. The ripple in the charge pump output is thereby reduced in a preferred embodiment to about 400 mV peak-to-peak or less. During slew mode, when the high current pump is charging an associated low current pump, the original clocking scheme is preserved to reduce the time necessary for the high current pump to raise the low current pump to a predetermined voltage.

FIG. 1 shows a computer system 100 into which the present invention can be incorporated. The system 100 includes a central processor 110 which carries out the various instructions provided to the computer 100 for its operations. The central processor 110 is joined to a bus 120 adapted to carry information to various components of the system 100. Joined to the bus 120 is main memory 102 which is typically constructed of dynamic random access memory arranged in a manner well known to those skilled in the prior art to store information during a period in which power is provided to the system 100. Also joined to the bus 120 is read only memory 112 which may include various memory devices well known to those skilled in the art each of which is adapted to retain a particular memory condition in the absence of power to the system 100. The read-only memory 112 typically stores various basic functions used by the processor 110 such as basic input/output processes and startup processes typically referred to as BIOS processes. Such read-only memory 112 may be constructed of flash EEPROM memory cells adapted to be modified as various ones of the BIOS processes used by a particular computer are changed. If the read-only memory 112 is constructed of flash EEPROM memory cells, it may be modified by running an update process on the computer itself to reprogram the values stored in the read-only memory 112. Typically, such flash EEPROM memory will include circuitry for programming and erasing the memory array.

Also connected to the bus 120 are various peripheral components such as long term memory 104 and circuitry such as a frame buffer 106 to which data may be written which is to be transferred to an output device such as a monitor 114 for display. The construction and operation of long term memory 104 (typically electromechanical hard disk drives) is well known to those skilled in the art. However, rather than the typical electromechanical hard disk drive, a flash EEPROM memory array may be used as the long term memory 104. Such flash EEPROM memory arrays are programmed and erased through techniques which utilize voltages greater than those typically available to the integrated circuits of more advanced portable computers. Such flash EEPROM memory arrays typically include circuitry for programming and erasing the memory array. Consequently, in accordance with the present invention, such long term memory arrays as well as memory 112 may provide circuitry for generating high voltages from the lower voltages available from the batteries typically utilized with such computers. In order to generate accurate high voltages for programming and erasing such flash EEPROM memory arrays the present invention introduces voltage regulation circuitry needed to generate precise programming voltages.

Circuitry is also shown in FIG. 1 by which power may be supplied through a power bus 130 to various components of the system 100. This includes in the exemplary embodiment a power control circuit 108 which controls the various states for applying power to the system 100 and a battery 116 which may be utilized in a portable computer for furnishing power to the system 100 under control of the power control circuitry 108. In any particular arrangement, the power control circuitry 108 may actually be a part of a particular portion of the circuit of FIG. 1. For example, if the read only memory were to be constructed of flash EEPROM memory devices, power control circuitry 108 including voltage reference circuitry in accordance with the present invention might be a physical portion of the read only memory block.

As noted above, charge pumps can be integrated according to known methods with flash EEPROM arrays to supply voltages needed to accomplish erase and program operations of flash memory when such voltages are not available from an external source. EEPROM arrays with integrated charge pumps can accordingly be used as long term memory 104 or read only memory 112.

FIG. 2 illustrates an improved charge pump circuit 200 that can be incorporated into a flash EEPROM array that is being used as long term memory 104 or read only memory 112. In the depicted embodiment, the circuit 200 reduces ripple in the output of a high current pump 201 by staggering the times at which charge is drawn from each of the pump's two arrays whenever it is in programming or in erase algorithms. The two arrays are controlled by two pairs of clock inputs 218/220 and 222/224, the second pair 222/224 being 180 degrees out phase with the first clock input pair 218/220 in this particular embodiment. The clock inputs cause the respective stages to alternately accumulate and then dump charge. When the circuit 200 is in slew mode, the high current pump is charging an associated low current pump. In this mode, circuit 201 is configured as a single array pump by connecting output 240 to the input of circuit 210. This is accomplished with a n-channel FET switch (not shown) activated by the level shifted signal from logic line 234. This type of connection allows the high current pump to help the low current pump reach a higher voltage level output. In slew mode, stages 1, 3, 5 and 7 accumulate charge in response to a first clock signal 218 and then, in response to a second clock signal 220, dump their charge to stages 2, 4, 6, and 8, respectively. In similar fashion, the second pair of clock signals 222/224 causes stages 2, 4, 6, and 8 to alternately accumulate charge and then discharge. The discharges from stages 4 and 8 occur simultaneously because stages 4 and 8 are controlled by the same pair of clock signals. In this case, the simultaneous discharge does not pose a problem because outputs 240 and 242 are connected to different nodes output 240 feeds circuit 210 and the pump output 242 feeds the low current pump. When the EEPROM is in a programming or erase algorithm, the pump is reconfigured to become a two array pump. In this mode, the pump output is taken from outputs 240 and 242 because a higher output current is needed by other circuits in the read only memory chip. In algorithm mode, the outputs from the two arrays (i.e. the outputs from stages 4 and 8), are staggered by multiplexing both pairs of clock inputs. Two multiplexers 226, 232 switch the clock inputs to the second array, effectively inverting the input clock signals and causing the output from the second array (i.e. the output from stage eight) to be 180 degrees out of phase with the output from the first array (i.e. the output of stage four). This arrangement reduces the peak-to-peak ripple in the charge pump output to about 400 mV or less.

The high current pump 201 includes eight discrete stages 202–216, the construction and operation of which are well known in the art and will not be described further herein. In programming or erase mode, the stages are arranged into two arrays each having four stages, each stage being powered by voltage source 244. The first array 202–208 terminates in charge pump output 240 and the second array 210–216 terminates in a second charge pump output 242. Four clock inputs 218–224 control the charge pumps 202–216. The first and second clock signals 218, 220 are directly connected to the first stage 202 and the third stage 206 and are connected to the fifth stage 210 and the seventh stage 214 through multiplexer 226. The third and fourth clock signals 222, 224 are directly connected to the second stage 204 and the fourth stage 208 and are connected to the sixth stage 212 and the eighth stage 216 through a second multiplexer 232. More particularly, outputs 228, 230 from the first multiplexer 226 are connected to the fifth stage 210 and the seventh stage 214. Outputs 236, 238 from the second multiplexer 232 are connected to the sixth stage 212 and the eighth stage 216. The multiplexer enabling lines are connected to a logic input 234 that is "1" when the associated EEPROM is in a program or erase algorithm and "0" when the charge pump is in slew mode (i.e. when the high current pump is charging an associated low current pump).

In slew mode, charge is output onto line 242 as it is driven by clock signal 224. Output 240 becomes an input to circuit 210 (by operation of the n-channel switch described above) and the charge dump happens simultaneously with the charge dump on 242. It should be noted that in slew mode multiplexer 226 passes signals 218, 220 to lines 228, 230 and multiplexer 232 passes signals 222, 224 to lines 236, 238. Because both stage 208 and stage 216 are controlled by the same clock pair, their outputs occur simultaneously. This arrangement advantageously provides for the rapid and efficient charging of an associated low current, high voltage charge pump connected to output 242 during slew mode.

When the associated EEPROM is in algorithm, the enabling line 234 goes high and activates multiplexers 226 and 232. Multiplexer 226 outputs clock signals 222 and 224 to lines 228, 230 and multiplexer 232 outputs signals 218, 220 to lines 236, 238. Accordingly, stages 210, 214 are controlled by clock signals 222 and 224 when the EEPROM is in algorithm. Simultaneously, stages 212, 216 are controlled by clocks signals 218, 220. The net effect is that the clock signals for stages 210–216 are each shifted 180 degrees out of phase relative to slew mode. That in turn shifts the output of stage 216 180 degrees relative to the output of stage 208.

The overall charge pumping operation proceeds as follows. Clocks 218 and 220 cause stage 202 and stage 210 to first accumulate charge greater than their respective input voltage supplies (i.e. voltage source 244 for stage 202 and output 240 for stage 210) and then dump the charge to stages 204 and 212, respectively. This basic charge pump operation is well known in the art and will not be described in further detail here. Clocks 222 and 224 then cause stage 204 and stage 212 to accumulate an even greater charge and then dump the resultant charge to stages 206 and 214, respectively. Clocks 218 and 220 then cause stage 206 and stage 214 to further accumulate charge and then dump the resultant charge to stages 208 and 216, respectively. Clocks 222 and 224 then cause stage 208 and stage 216 to accumulate further charge and then dump the resultant charge to outputs 240 and 242, respectively. Output 240 feeds into circuit 210 while output 242 is connected to an associated low current pump (not shown), and thereby serve to charge the low current pump to a predetermined voltage.

When the EEPROM enters a program or erase algorithm, the stages are arranged into two arrays each having four stages. Output 240 is disconnected from circuit 210 by operation of the aforementioned n-channel switch and it thereafter directly feeds into the pump output together with output 242. In this mode, the enabling line goes high, and the multiplexers 226 and 232 invert the clock signals to the second array 210–216 so that clock signals 218 and 220 control stage 212 and stage 216 and clock signals 222 and 224 control stage 210 and stage 214. The charge pumping operation proceeds as before except that the output from stage 216 is controlled by clocks 218 and 220 rather than 222 and 224. Accordingly, the charge dump from stage 216 occurs about 180 degrees out of phase from the output from stage 208.

Figure 3:
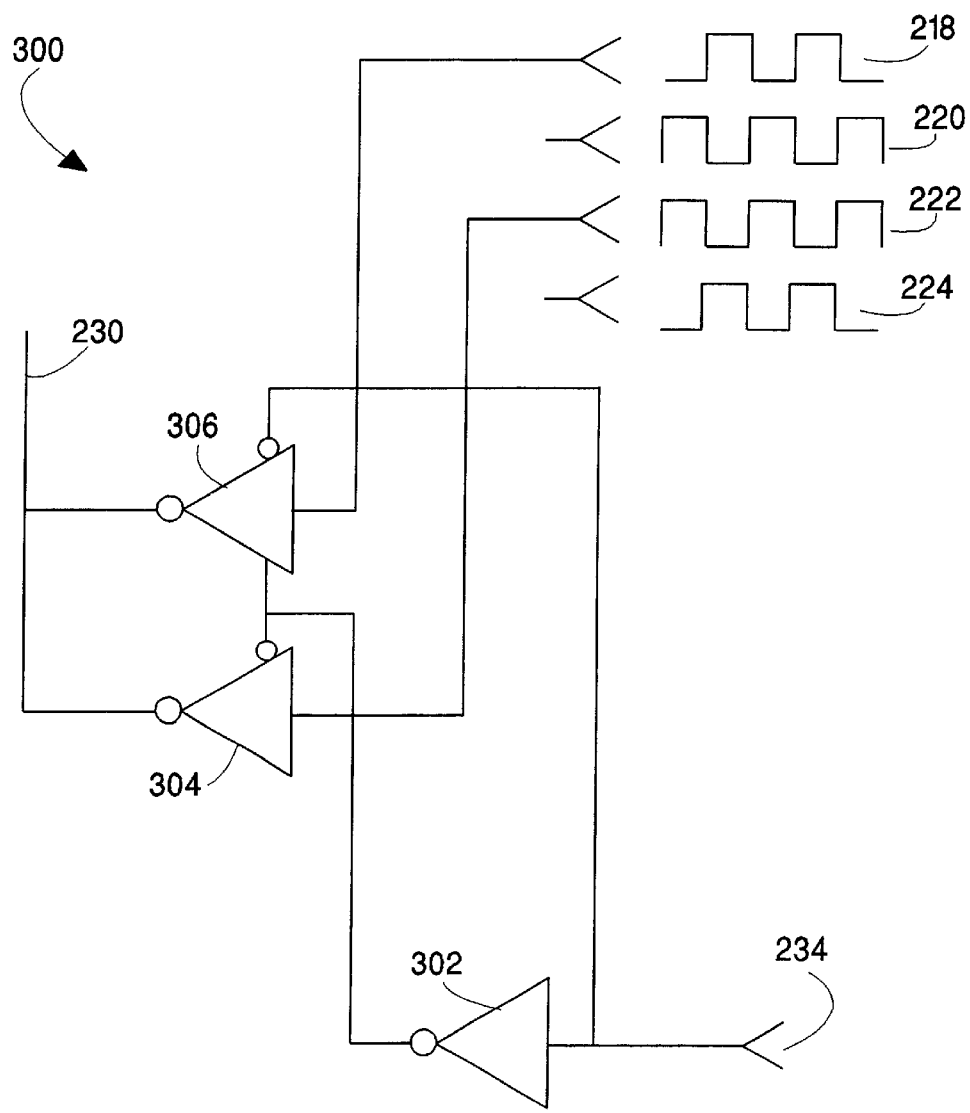
FIG. 3 is a circuit diagram illustrating a multiplexing circuit that can be used in the circuit of FIG. 2.

FIG. 3 depicts a multiplexing circuit 300 that optionally can be used in place of multiplexers 226 and 232. Clock signals 218 and 222 feed high voltage inverters 304 and 306 and the enabling line 234 feeds inverter 302. The high voltage inverters 304 and 306 pass the respective clock signal inputs when the bar input is "0" and the other input is "1." In slew mode, the enabling line 234 is low and output from the inverter 302 is high. Accordingly, the high voltage inverter 306 is enabled and clock signal 218 is passed to line 230. In algorithm, enabling line 234 is high and the output from inverter 302 is low. High voltage inverter 304 is thereby enabled and signal 222 is passed to line 230. The illustrated circuit thus toggles line 230 between clock signal 218 and clock signal 222 based upon enabling line 234. The complete multiplexing function is achieved by replicating circuit 300 in connection with each of the three remaining control lines 228, 238, 236.

In other embodiments, the circuit of the instant invention can be used in connection with other types of charge pumps or voltage pumps, such as low current pumps. The charge pump controlled by the circuit can have any number of stages, arrays, and outputs. Each stage of each array can be freely substituted with other known or hereafter developed charge pumps so long as the substitute stages are subject to one or more control signals. The utility of the instant control circuit is not limited to EEPROM control. The circuit can be implemented to stagger charge pump output to virtually any IC or discrete circuit element. The circuit 200 can also be readily modified to work with multiple discrete charge pumps by providing the desired number of clock signals to the multiplexers and electrically connecting the multiplexers to the various stages of the charge pumps. Any number of clock signals can be used to control the charge pumps according to the instant invention. The multiplexers 226, 232 or circuit 300 can be replaced with other suitable IC's, including PLA, PAL, PGA, decoder, inverter chain, and combinational logic circuits. The charge pump outputs need not be completely in phase during slew mode. Nor do the control signal inputs need to be completely out of phase. Other phase shifts such as 45, 90, or 135 degrees can be advantageously implemented to achieve one or more of the aforementioned benefits, such as output ripple reduction. Many other such modifications can be readily made to adapt the instant control circuit to other circuit environments.

Aspects of the invention provide for one or more of the following advantages. The circuit can permit selective control of the rippling of current pump output. The ripple control circuit need not be activated during any particular portion of a clock cycle, but rather can be implemented only during operations or time periods in which charge pump output rippling is of particular concern. During other operative modes or time periods, the efficiency and speed of the charge pump can be optimized by permitting it to operate according to steady state clock or control signals. The circuit can be constructed with a minimum of logical devices or combinational logic, thereby significantly reducing size and cost. However, there exists tremendous flexibility to provide additional control by the addition of further logical devices or combinational logic, as desired. The circuit is also readily adaptable to environments other than EEPROM charge pumps.

A number of embodiments of the invention have been described. Nevertheless, it will be understood that various modifications may be made without departing from the spirit and scope of the invention. Accordingly, other embodiments are within the scope of the following claims.

What is claimed is:

1. A circuit comprising:
   at least two charge pump arrays each having:
      first and second stages connected in series, the first stage receiving a first set of clock signals and the second stage receiving a second set of clock signals that are out of phase with the first set of clock signals, and
      an output, wherein the outputs are electrically connected to each other so as to provide an aggregate supply voltage; and
   a timing circuit connected to the arrays controlling whether the arrays dump their charge to the output a synchronously or synchronously according to a control signal.

2. The circuit of claim 1, wherein each of the charge pump arrays has at least four stages.

3. The circuit of claim 1, wherein the timing circuit includes a multiplexer.

4. The circuit of claim 1, wherein the timing circuit is comprised of circuit elements selected from the group consisting of inverters and combinational gates.

5. The circuit of claim 1, wherein the timing circuit receives a plurality of clock signals.

6. The circuit of claim 5, wherein the plurality of clock signals are electrically connected to at least one of the arrays by the timing circuit.

7. The circuit of claim 1, further comprising an EEPROM coupled to the outputs.

8. The circuit of claim 1, wherein the charge is dumped onto an output line from a last stage in each of the arrays.

9. The circuit of claim 1, wherein the arrays dump their charge at least about 45 degrees out of phase when asynchronous dumping occurs.

10. A circuit comprising:
   at least two charge pump arrays each having an output, wherein the outputs are electrically connected to each other so as to provide an aggregate supply voltage; and
   a multiplexing circuit having an input electrically connected to at least two clocks signals and an output electrically connected to at least one of said arrays, wherein said multiplexing circuit outputs a first oscillating clock signal when enabled and a second oscillating clock signal when disabled;
   wherein the arrays dump charge asynchronously in one of said enabled or disabled conditions.

11. The circuit of claim 10, wherein each of the arrays has a single stage.

12. The circuit of claim 10, wherein said multiplexing circuit is comprised of elements selected from the group consisting of inverters and combinational gates.

13. The circuit of claim 10, wherein the arrays dump their charge at least about 45 degrees out of phase.

14. The circuit of claim 10, wherein the charge is dumped onto an output line from a last stage in each of the arrays.

15. The circuit of claim 10, wherein each of the charge pump arrays includes first and second stages connected in series.

16. A method comprising:
   generating a plurality of control signals;
   outputting a first set of the control signals to a first charge pump array;
   selectively outputting either the first set of the control signals or a second set of the control signals to a second charge pump array according to a selection signal; and
   generating a pumped supply voltage in response to the first set of control signals and the second set of control signals.

17. The method of claim 16, wherein each of the arrays has at least one stage.

18. The method of claim 16, wherein the second set of control signals is provided by at least one multiplexer.

19. The method of claim 16, wherein said sets of control signals are selected by a circuit comprised of elements selected from the group consisting of inverters and combinational gates.

20. The method of claim 16, wherein said sets of control signals comprise a plurality of clocks signals.

21. The method of claim 16, wherein said sets of control signals are selectively output in response to at least one enabling logic signal as the selection signal.

22. The method of claim 16, further comprising programming an EEPROM with a current supplied by at least one of the charge pump arrays.

23. The method of claim 16, further comprising dumping charge onto an output line from the last stage in each of the arrays.

24. The method of claim 23, wherein in a first condition the charge is dumped from each of the arrays substantially simultaneously and in a second condition the charge is dumped from each of the arrays substantially asynchronously.

25. The method of claim 24, wherein the arrays dump their charge at least about 45 degrees out of phase in said second condition.

26. The method of claim 16, wherein each of the charge pump arrays includes first and second stages connected in series.

27. The method of claim 26, wherein the sets of control signals comprise clock signals and wherein each of the first stages receives a first pair of clock signals that are out of phase from a second pair of clock signals received by each of the second stages.

28. A method comprising:
   generating control signals;
   selectively switching at least two of the control signals;
   outputting the control signals and the switched control signals to a plurality of charge pump arrays;
   generating a pumped supply voltage in response to the control signals and switched control signals; and
   dumping charge onto an output line from the last stage in each of the arrays,
   wherein in a first condition the charge is dumped from each of the arrays substantially simultaneously and in a second condition the charge is dumped from each of the arrays substantially asynchronously.

29. The method of claim 28, wherein the arrays dump their charge at least about 45 degrees out of phase in the second condition.

* * * * *